US012126594B2

(12) United States Patent
Naidoo

(10) Patent No.: US 12,126,594 B2
(45) Date of Patent: Oct. 22, 2024

(54) TRANSACTION FIREWALL METHOD AND SYSTEM

(71) Applicant: INETCO SYSTEMS LIMITED, Burnaby (CA)

(72) Inventor: Ugan Naidoo, North Vancouver (CA)

(73) Assignee: INETCO SYSTEMS LIMITED, Burnaby (CA)

( * ) Notice: Subject to any disclaimer, the term of this patent is extended or adjusted under 35 U.S.C. 154(b) by 295 days.

(21) Appl. No.: 17/744,816

(22) Filed: May 16, 2022

(65) Prior Publication Data

US 2022/0385632 A1 Dec. 1, 2022

Related U.S. Application Data

(60) Provisional application No. 63/193,540, filed on May 26, 2021.

(51) Int. Cl.
*H04L 9/40* (2022.01)
*G06Q 20/40* (2012.01)
(52) U.S. Cl.
CPC ..... *H04L 63/0218* (2013.01); *G06Q 20/4016* (2013.01)
(58) Field of Classification Search
CPC .................................................. H04L 63/0218
USPC ......................................................... 726/11
See application file for complete search history.

(56) References Cited

U.S. PATENT DOCUMENTS

| 7,610,233 | B1 * | 10/2009 | Leong ................. | G06Q 10/087 705/28 |
|---|---|---|---|---|
| 8,566,919 | B2 | 10/2013 | Meisel | |
| 9,660,960 | B2 | 5/2017 | Phonsa et al. | |
| 2010/0106611 | A1 | 4/2010 | Paulsen et al. | |
| 2010/0325371 | A1 | 12/2010 | Jagadish et al. | |
| 2012/0130903 | A1 | 5/2012 | Dorsey et al. | |
| 2017/0004500 | A1 * | 1/2017 | Lim ..................... | G06Q 20/405 |

OTHER PUBLICATIONS

International Searching Authority (ISA/CA), International Search Report and Written Opinion, mailed Sep. 9, 2022, for corresponding/related International Patent Application No. PCT/CA2022/000022.

* cited by examiner

*Primary Examiner* — Anthony D Brown
(74) *Attorney, Agent, or Firm* — CONNEELY PC; Joseph Conneely

(57) ABSTRACT

A method for detecting fraudulent transactions entering a payment environment, the method comprising: receiving packets of a transaction from a network; reconstructing and framing the packets into respective transaction messages; decoding each transaction message into its respective fields; correlating the respective transaction messages into an end-to-end model of the transaction; applying one or more predefined rules to the respective fields to determine whether the transaction is fraudulent; when the transaction is determined to be fraudulent, determining one or more specified fields of the respective fields to use to selectively block, deny, or rate limit the transaction; selecting a corresponding predefined rule from a server rule base; storing the predefined rule in a transaction firewall rule base; and, applying the predefined rule to the transaction to selectively block, deny, or rate limit the transaction based on content of the one or more specified fields in the transaction.

23 Claims, 16 Drawing Sheets

```
001> 31 31 1C
002> 39 39 39 1C
003> 1C
004> 1C
005> 31 3C 1C
006> 3B 3B 34 38 34 31 32 38 30 30 30 30 30 32 35 30 34 32 3D
007> 30 39 30 39 31 30 31 36 38 33 35 30 30 30 30 30 30 31 37 3F 1C
008> 1C
009> 20 20 41 41 20 20 20 20 1C
010> 30 30 30 30 30 30 30 30 1C
011> 31 36 3C 3B 3E 33 30 3A 39 3E 3D 39 35 3A 3B 3F 1C
012> 1C
```

600

```
NAME=ISO8583_AUTH_REQ
DESCRIPTION="ISO8583 Authorization Request"
CHARSET=ANSI-1252

FIELD START
# Field Name          Datatype      Width Condition         Restr        Description
# -----------         --------      ----- ---------         -----        -----------
MSG_TYPE_ID           n             4     -                 -            -
PRI_BITMAP            b             8     -                 -            -
```

TRANSACTION FIREWALL METHOD AND SYSTEM

This application claims priority from and the benefit of the filing date of U.S. Provisional Patent Application No. 63/193,540, filed May 26, 2021, and the entire content of such application is incorporated herein by reference.

FIELD OF THE APPLICATION

This application relates to the field of network message monitoring, and more specifically, to a transaction firewall method and system.

BACKGROUND OF THE APPLICATION

Fraud attacks are rampant in financial institutions. These attacks have become increasingly sophisticated over the years. Due to the advanced nature of many of these attacks, they can go unnoticed for a period of time, resulting in huge losses for financial institutions. Even once the attack is detected, it is difficult using existing methods and systems to stop the attack, without disrupting other legitimate transactions.

Some of these attacks are orchestrated using malicious software called "malware" that is used to infect critical financial transaction processing systems. Once the transaction processing systems are infected and compromised, fraudulent transactions are conducted in rapid succession. The malware forces the transaction processing system to blindly approve these fraudulent transactions allowing "money mules" to make off with large amounts of cash that is withdrawn from automated teller machines ("ATMs").

There are many variations of this attack, but in essence, these attacks are categorized as "man-in-the-middle" attacks. One method of stopping these attacks is to block transactions from being processed, either by turning off the infected and compromised transaction processing system, or by blocking the transactions at a firewall before they make it to the transaction processing system, so that the transactions are not fraudulently authorized.

The problem with this approach is that legitimate transactions carried out at the same time over the same network would also be blocked. This adversely impacts regular customers and ultimately results in a denial of service, loss of revenue, and poor customer satisfaction. The reason for this is that existing firewalls are only able to block traffic based on Internet Protocol ("IP") address and/or port number. When transactions enter the financial institution's data center, the IP address and port number of bad and good transactions appear the same, as these transactions are acquired by third parties that route the transactions across many networks and intermediaries. This means that the originating source IP address of a transaction is often not available to the financial institution that needs to authorize the transaction. This makes it difficult to block an individual bad transaction at the network level using the IP address and port number alone, as this would result in also blocking legitimate transactions.

A need therefore exists for an improved transaction firewall method and system. Accordingly, a solution that addresses, at least in part, the above and other shortcomings is desired.

SUMMARY OF THE APPLICATION

According to one aspect of the application, there is provided a method for detecting fraudulent transactions entering a payment environment using a transaction firewall communicatively coupled to a server, the method comprising: using a processor at the transaction firewall, receiving packets of a transaction from a network, the transaction following a transaction journey through the payment environment, the transaction journey having one or more legs extending between systems of the payment environment coupled by the network; reconstructing and framing the packets from each leg into respective transaction messages in accordance with respective transaction message formats; decoding each transaction message into its respective fields; sending each transaction message and its respective fields to the server; using a processor at the server, correlating the respective transaction messages for each leg of the transaction journey into an end-to-end model of the transaction, the correlating based on content of the respective fields; applying one or more predefined rules to the content of each of the respective fields to determine whether the transaction is fraudulent; when the transaction is determined to be fraudulent, determining one or more specified fields of the respective fields to use to selectively block, deny, or rate limit the transaction; selecting a corresponding predefined rule from a server rule base; sending the predefined rule to the transaction firewall, the predefined rule identifying the one or more specified fields; at the transaction firewall, receiving the predefined rule and storing the predefined rule in a transaction firewall rule base; applying the predefined rule to the transaction to selectively block, deny, or rate limit the transaction based on content of the one or more specified fields in the transaction; and, when the transaction is determined not to be fraudulent, that is, when the transaction firewall rule base does not include an applicable predefined rule, bridging the transaction through the transaction firewall and into the payment environment.

According to another aspect of the application, there is provided a method for detecting fraudulent transactions entering a payment environment using a transaction firewall communicatively coupled to a server, the method comprising: using a processor at the transaction firewall, receiving packets of a transaction from a network, the transaction following a transaction journey through the payment environment, the transaction journey having one or more legs extending between systems of the payment environment coupled by the network; reconstructing and framing the packets from each leg into respective transaction messages in accordance with respective transaction message formats; decoding each transaction message into its respective fields; sending each transaction message and its respective fields to the server; receiving a predefined rule from the server and storing the predefined rule in a transaction firewall rule base, the predefined rule identifying one or more specified fields; applying the predefined rule to the transaction to selectively block, deny, or rate limit the transaction based on content of the one or more specified fields in the transaction; and, when the transaction is determined not to be fraudulent, that is, when the transaction firewall rule base does not include an applicable predefined rule, bridging the transaction through the transaction firewall and into the payment environment.

According to a further aspect of the application, there is provided a method for detecting fraudulent transactions entering a payment environment using a server communicatively coupled to a transaction firewall, the method comprising: using a processor at the server, for a transaction, receiving each transaction message and its respective fields from the transaction firewall, the transaction following a transaction journey through the payment environment, the transaction journey having one or more legs extending between systems of the payment environment coupled by a network; correlating the respective transaction messages for each leg of the transaction journey into an end-to-end model of the transaction, the correlating based on content of the respective fields; applying one or more predefined rules to the content of each of the respective fields to determine whether the transaction is fraudulent; when the transaction is determined to be fraudulent, determining one or more specified fields of the respective fields to use to selectively block, deny, or rate limit the transaction by the transaction firewall; selecting a corresponding predefined rule from a server rule base; and, sending the predefined rule to the transaction firewall, the predefined rule identifying the one or more specified fields.

In accordance with further aspects of the present application there is provided an apparatus such as a data processing system, a method for adapting same, as well as articles of manufacture such as a computer readable medium or product or software product (e.g., comprising a non-transitory medium) having program instructions recorded thereon for practising the method of the application.

BRIEF DESCRIPTION OF THE DRAWINGS

Further features and advantages of the embodiments of the present application will become apparent from the following detailed description, taken in combination with the appended drawings, in which:

FIG. 10 is an example decode table in accordance with an embodiment of the application;

It will be noted that throughout the appended drawings, like features are identified by like reference numerals.

DETAILED DESCRIPTION OF THE EXAMPLE EMBODIMENTS

In the following description, details are set forth to provide an understanding of the application. In some instances, certain software, circuits, structures and methods have not been described or shown in detail in order not to obscure the application. The term "data processing system" is used herein to refer to any machine for processing data, including the computer systems, servers, firewalls, wireless devices, and network arrangements described herein. The present application may be implemented in any computer programming language provided that the operating system of the data processing system provides the facilities that may support the requirements of the present application. Any limitations presented would be a result of a particular type of operating system or computer programming language and would not be a limitation of the present application. The present application may also be implemented in hardware or in a combination of hardware and software.

Figure 1:
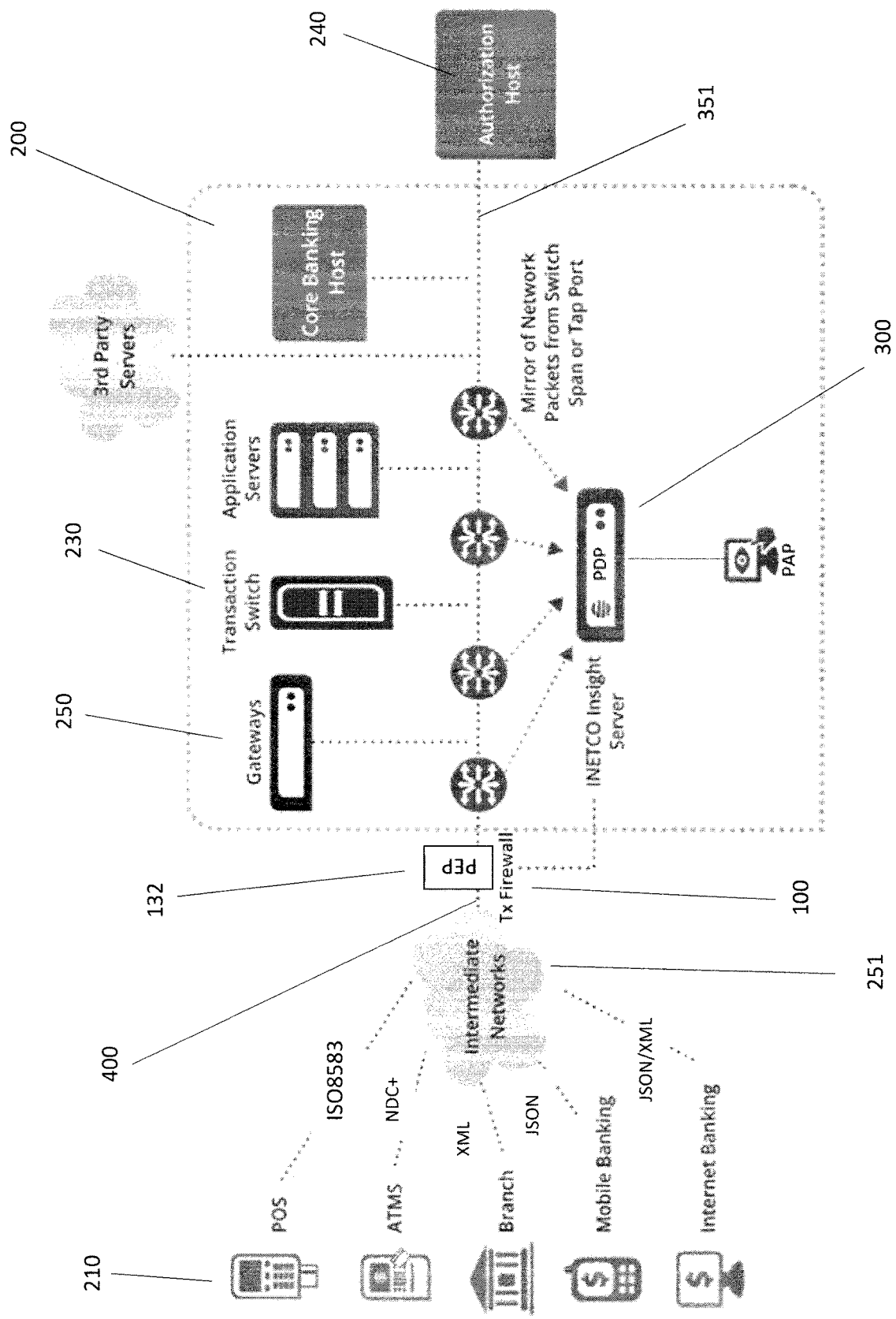
FIG. 1 is a block diagram illustrating a transaction firewall in a payment environment in accordance with an embodiment of the application.
Figure 2:
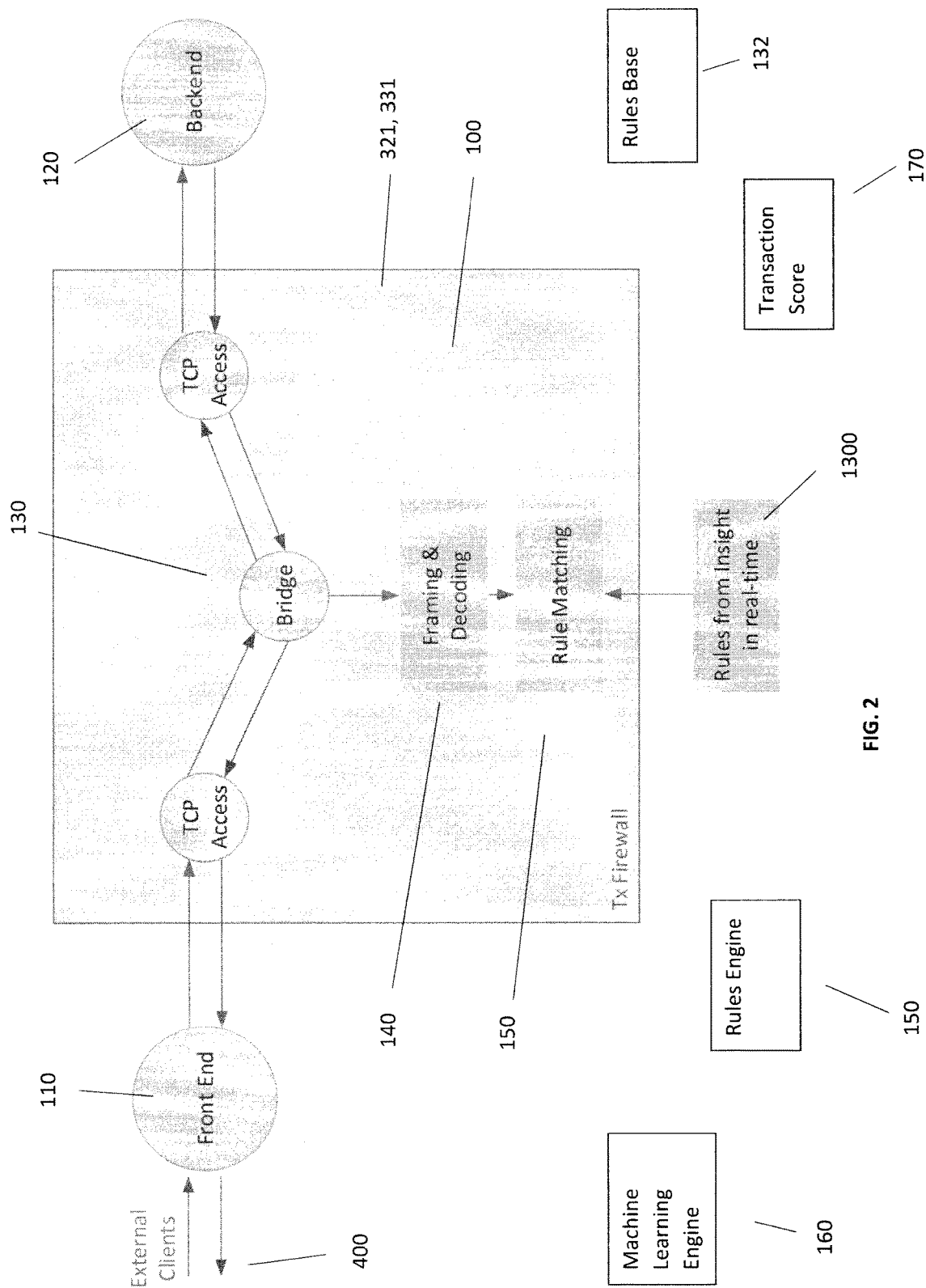
FIG. 2 is a block diagram illustrating core modules of the transaction firewall in accordance with an embodiment of the application.

FIG. 1 is a block diagram illustrating a transaction firewall 100 (e.g., module 321, 331, system 300) in a payment environment 200 in accordance with an embodiment of the application. And, FIG. 2 is a block diagram illustrating core modules 321, 331 of the transaction firewall 100 in accordance with an embodiment of the application.

According to one embodiment of the application, a transaction firewall 100 is provided. The transaction firewall 100 is a field level firewall that has the ability to reconstruct the entire payload 530 of a message 460 and decode every field 510 and make these fields 510, 511 available to a firewall rule base 132 where rules 1300 can be applied directly to these fields 510, 511 in order to allow, deny or rate limit a transaction 400. With the transaction firewall 100, transactions 400 that come across the same network 351 can be acted on individually, without affecting other transactions 400 that are coming across the same network 351. In the following and depending on context, the term field 510 (and similar terms) may be used with respect to the structure 500 of a message 460 and/or to indicate the information content or data contained in the field 510.

The transaction firewall 100 is a security device (e.g., module 321, 331, system 300) that is able to protect payment environments 200 from a range of modern attacks by: collecting (or sniffing) packet data 550 at each leg 451 of a transaction journey 450; reconstructing and framing the packet data 550 from each leg 451 into respective transaction message formats 500; decoding the transaction messages 460 into their respective fields 510; correlating each leg 451 of the journey 450 into an end-to-end view of the transaction 400 and all fields 510 associated with the payload 530; applying a range of rules 1300 and machine learning ("ML") algorithms to the fields 510 of the transaction 400 to detect transaction anomalies; and, selectively allowing, denying or rate limiting transactions 400 based on specified fields 511 in a transaction message 460. The transaction firewall 100 is a field level firewall where rules 1300 can be applied to every field 510 that has been decoded by the transaction firewall 100.

With the transaction firewall 100 of the present application, transactions 400 can be individually acted on (e.g., blocked, allowed, rate-limited, etc.) based on fields 510 within the message 460 instead of IP address and port number. This is accomplished by fully decoding every field 510 in a financial message 460, and using this field level information to act on the transaction 400. Advantageously, this improves the precision of detection and prevention of potentially fraudulent transactions 400 from being authorized. The transaction firewall 100 is message aware and reassembles every packet 550 for each transaction message 460, then decodes the message 460 into its various transaction fields 510 and applies these fields 510 to a firewall rule base 132 at "wire speed" (e.g., in real-time) with very low latency. The transaction firewall 100 provides a method and system for inspecting every field 510 in a transaction message 450 and spotting, based on these fields 510, anomalous transactions 400 that would potentially be classified as fraudulent, and with surgical precision, the ability to alter the flow of the transaction 400 based on field level information and not on the IP address or port number.

The transaction firewall 100 of the present application is a payment transaction specific firewall that that is able to understand the many data fields 510 associated with a transaction (e.g., payment transaction, financial transaction, etc.) 400 and is able to apply business rules (e.g., 1300) to the transaction 400 in order to effect the flow of the transaction 400. The transaction firewall 100 is a policy enforcement point ("PEP") that is controlled in real-time by a policy decision point ("PDP") system or server 300 (e.g., the Insight Server™ from Inetco System Limited). FIG. 1 shows an example implementation of the transaction firewall 100 within a payment environment 200. The transaction firewall 100 may be implemented between existing network firewalls and the payment gateway(s) 250 that requires protection. For reference, a PEP is a point which intercepts a user's access request to a resource, sends a decision request to the PDP to obtain an access decision (e.g., access to the resource is approved or rejected), and acts on the received decision. A PDP is a point which evaluates access requests against authorization policies (e.g., rules) before issuing access decisions.

The transaction firewall 100 receives instructions in real-time from the server 300 (see the dotted line from the Insight Server 300 shown in FIG. 2) to block or rate limit payment transactions 400, and these instructions are based on machine learning algorithms 160 and a rules engine 150. Under normal operating conditions, when legitimate transactions 400 are flowing through the payment environment 200, no rules 1300 would be applied by the transaction firewall rule base 132, in which case the transaction firewall 100 would "bridge" 130 the connection between its ingress (front end) and egress (backend) interfaces 110, 120, and would behave as a pass-through for payment transactions 400.

When a set of fraudulent transactions 400 take place, the server 300 detects these fraudulent transactions 400 by decoding the message fields 510 and applying a set of predefined rules 1300 to these fields 510, 511 that have been configured in the server rule base 332, or through passing these fields 510 through a set of machine learning algorithms 160, 331 which would detect transaction anomalies. Once the transaction fields 510 are passed through the server rule base 332 and the machine learning algorithms 160, 331, a transaction score 170 is obtained. The transaction score 170 can be any number between 0 and 100. Based on set thresholds for the transaction score 170, if a transaction 400 is scored between 80 and 100, it could be considered as a potentially fraudulent transaction 400.

Once the potentially fraudulent transaction(s) 400 is/are detected, the server 300 determines the best (or specified) fields 511 of the fields 510 to use to block or rate limit the offending transactions 400. The server 300 then communicates with the transaction firewall 100 in real-time and implements a rule (e.g., 1310) on the transaction firewall rule base 132. Now that a rule 1310 has been defined on the transaction firewall 100, the transaction firewall 100 would begin framing each packet into its respective transaction message 460 and once framed, the transaction message 460 would then be passed to a decode module 140 (e.g., 321, 331) which would decode the field level information contained in the message 460. Decoding is the act of reconstructing the transaction message 460 and extracting the various fields 510 that are present in the transaction message 460 by making use of a decode table 1000. The decode table 1000 provides the transaction firewall 100 with instructions on how to extract the fields 510 from specific message protocols.

Once the fields 510 for the transaction 400 are decoded, the transaction firewall 100 uses the decoded fields 510, 511 to compare against the rule 1310 that has been implemented. Every transaction 400 is now decoded and the associated fields 510 are compared until a match is found. If there is no match of the transaction fields 510, 511 to the rule 1310, the transaction 400 is forwarded to the egress interface 120 for authorization. If a match is found to a transaction field 510, 511 and the rule 1310, the transaction 400 is dropped or rate limited, based on the rule action.

In particular, the server 300 will use the fields 510, 511 that are configured in the firewall rule base 132 to block or rate limit the transaction 400. Rate limit means to slow down the transaction 400, that is, to hold it in memory 330 for a predefined period before processing it. The reason for this is to slow down certain high velocity attacks that may be taking place.

The transaction firewall 100 is able to block individual transactions 400 that may be carried across a network 351 where the IP address and/or port number of the offending transaction 400 may be the same for legitimate transactions 400. As existing firewalls block transactions 400 at the IP address and/or port number level, if an attempt is made by these firewalls to block a fraudulent transaction 400, they would also block legitimate transactions 400. According to the present application, the transaction firewall 100 is triggered by the server 300 which is constantly monitoring the journey 450 of every transaction 400 and can block transactions 400 based on transaction fields 510 which are in turn based on financial protocols such as ISO 8583 and other proprietary protocols.

With respect to the machine learning algorithms or engines 160, these may be stored in transaction firewall 100 and/or in the server 300 as software models 331 and/or as information in the database 132, 332. Machine learning according to the present application uses both supervised and unsupervised machine learning. Unsupervised machine learning detects new fraud types, while supervised machine learning detects new fraud types with a high degree of precision. Machine learning training is performed on a real-time basis as transactions 400 flow into the environment 200 and/or system 300.

With respect to the transaction score 170, according to one embodiment, it is a weighted value that is generated based on the output of the rules engine 150 and the supervised and unsupervised machine learning engines 160. Each of these engines 150, 160 calculates a risk score for every transaction 400 and the weighted average of these risk scores is used as the transaction score 170.

Figure 3:
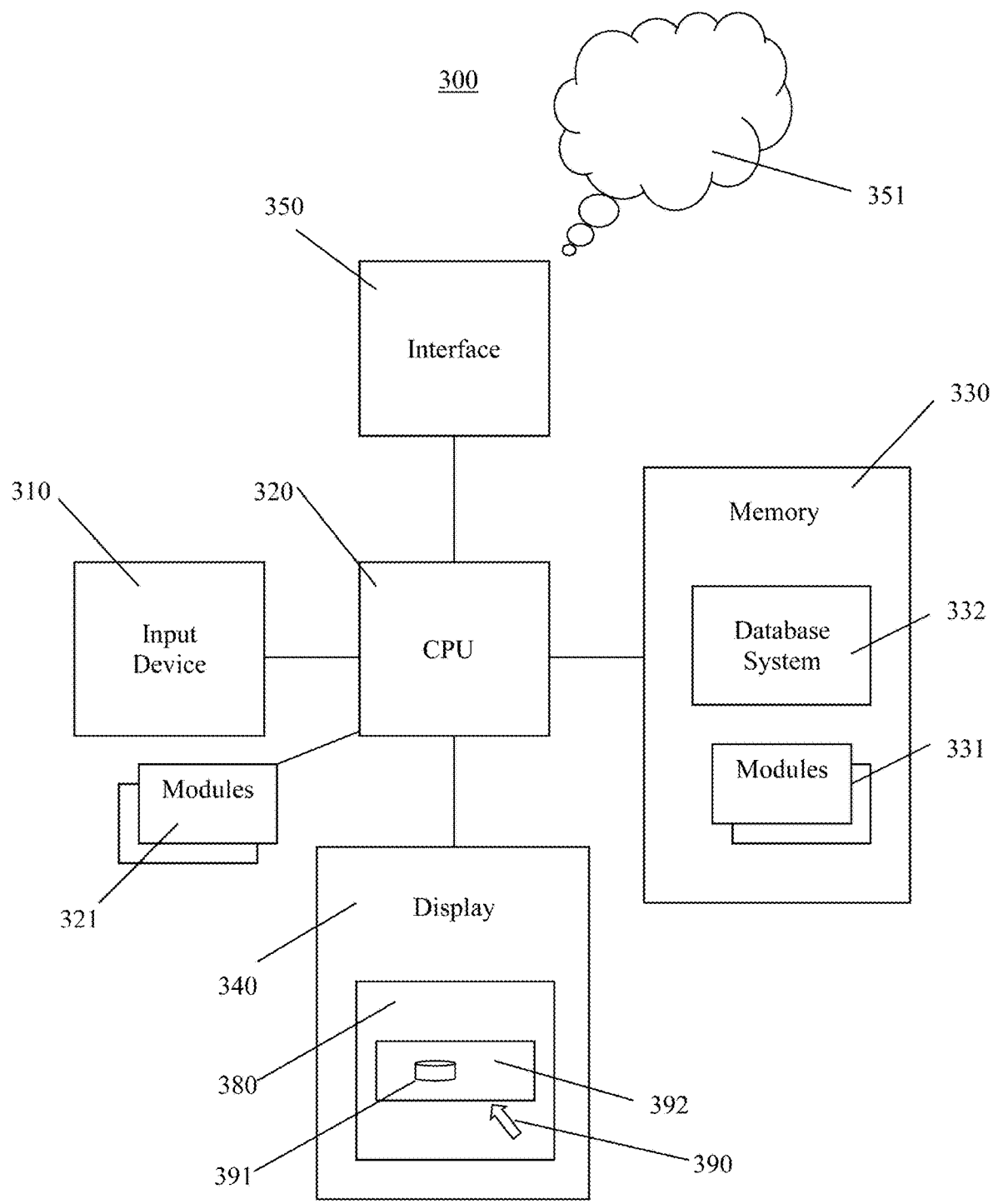
FIG. 3 is a block diagram illustrating a data processing system in accordance with an embodiment of the application.

FIG. 3 is a block diagram illustrating a data processing system 300 in accordance with an embodiment of the application. The data processing system 300 is suitable for performing as a transaction firewall 100, PEP 100, PDP 300, or server 300 and for implementing methods and modules 321, 331 of a transaction firewall 100 and server 300. The data processing system 300 is also suitable for generating, displaying, and adjusting presentations in conjunction with a graphical user interface ("GUI"), as described below. The data processing system 300 may be a client and/or server in a client/server system. For example, the data processing system 300 may be a server system or a personal computer ("PC") system. The data processing system 300 may also be a wireless device or other mobile, portable, or handheld device. The data processing system 300 includes an input device 310, a central processing unit ("CPU") 320, memory 330, a display 340, and an interface device 350. The input device 310 may include a keyboard, a mouse, a trackball, a touch sensitive surface or screen, a position tracking device, an eye tracking device, or a similar device. The display 340 may include a computer screen, television screen, display screen, terminal device, a touch sensitive display surface or screen, or a hardcopy producing output device such as a printer or plotter. The memory 330 may include a variety of storage devices including internal memory and external mass storage typically arranged in a hierarchy of storage as understood by those skilled in the art. For example, the memory 330 may include databases, random access memory ("RAM"), read-only memory ("ROM"), flash memory, and/or disk devices. The interface device 350 may include one or more network connections. The data processing system 300 may be adapted for communicating with other data processing systems (e.g., similar to data processing system 300 such as, for example, the transaction firewall 100, the PEP 100, the PDP 300, etc.) over a network 351 via the interface device 350. For example, the interface device 350 may include an interface to a network 351 such as the Internet and/or another wired or wireless network (e.g., a wireless local area network ("WLAN"), a cellular telephone network, the Internet, etc.). As such, the interface 350 may include suitable transmitters, receivers, antennae, etc. In addition, the data processing system 300 may include a Global Positioning System ("GPS") receiver. Thus, the data processing system 300 may be linked to other data processing systems by the network 351. The CPU 320 may include or be operatively coupled to dedicated coprocessors, memory devices, or other hardware modules 321. The CPU 320 is operatively coupled to the memory 330 which stores an operating system (e.g., 331) for general management of the system 300. The CPU 320 is operatively coupled to the input device 310 for receiving user commands or queries and for displaying the results of these commands or queries to the user on the display 340. Commands and queries may also be received via the interface device 350 and results may be transmitted via the interface device 350. The data processing system 300 may include a database system 332 (or store) for storing data and programming information. The database system 332 may include a database management system (e.g., 332) and a database (e.g., 332) and may be stored in the memory 330 of the data processing system 300. In general, the data processing system 300 has stored therein data representing sequences of instructions which when executed cause the method(s) described herein to be performed. Of course, the data processing system 300 may contain additional software and hardware a description of which is not necessary for understanding the application.

Thus, the data processing system 300 includes computer executable programmed instructions for directing the system 300 to implement the embodiments of the present application. The programmed instructions may be embodied in one or more hardware modules 321 or software modules 331 resident in the memory 330 of the data processing system 300 or elsewhere (e.g., 320). Alternatively, the programmed instructions may be embodied on a computer readable medium or product (e.g., a compact disk ("CD"), a floppy disk, etc.) which may be used for transporting the programmed instructions to the memory 330 of the data processing system 300. Alternatively, the programmed instructions may be embedded in a computer-readable signal or signal-bearing medium or product that is uploaded to a network 351 by a vendor or supplier of the programmed instructions, and this signal or signal-bearing medium may be downloaded through an interface (e.g., 350) to the data processing system 300 from the network 351 by end users or potential buyers.

A user may interact with the data processing system 300 and its hardware and software modules 321, 331 using a graphical user interface ("GUI") 380 (and related GUI software modules 331). The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input device 310 such as a mouse. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input device (e.g., a mouse) 310 to position a pointer or cursor 390 over an object (e.g., an icon) 391 and by "clicking" on the object 391. Typically, a GUI based system presents application, system status, and other information to the user in one or more "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

According to one embodiment, the transaction firewall 100 may be implemented in hardware (e.g., by a data processing system 300, hardware modules 321, etc.) or in software (e.g., by software modules 331 (also 132, 332, 150, 160, etc.) running on a data processing system 300). According to one embodiment, the transaction firewall (or PAP) 100 and the PDP server 300 may be implemented by the same data processing system 300. According to another embodiment, the transaction firewall (or PAP) 100 and the PDP server 300 may be implemented by separate data processing systems 300 linked over a network 351.

Figure 4:
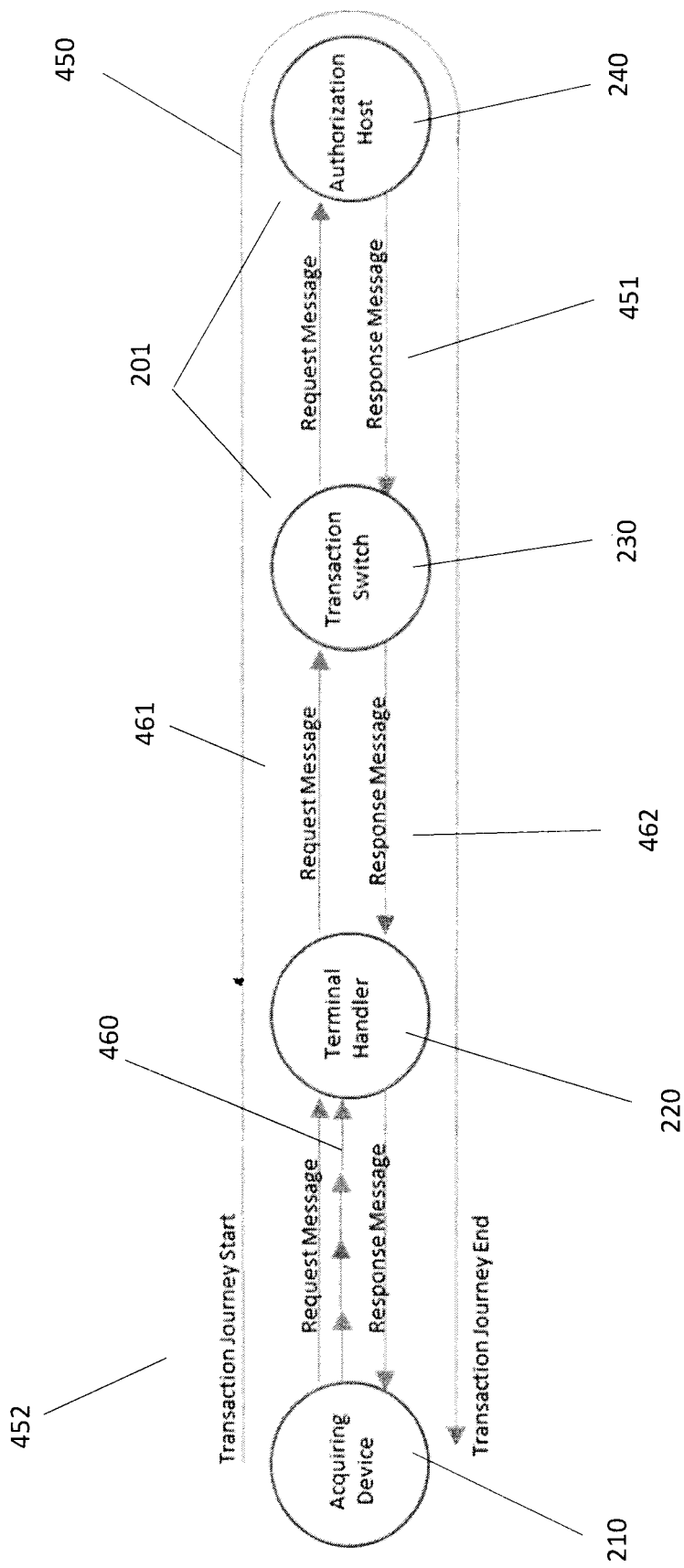
FIG. 4 is a block diagram illustrating an example transaction journey in accordance with an embodiment of the application.

FIG. 4 is a block diagram illustrating an example transaction journey 450 in accordance with an embodiment of the application. A transaction journey 450 is the roundtrip journey that a transaction 400 takes when, for example, a customer swipes their card for a purchase at a point-of-sale ("POS") device 210 at a store, to when approval is received. A transaction message 460 is a message that is sent between the different systems 201 (e.g., acquiring device 210, terminal handler 220, transaction switch 230, authorization host 240, etc.) of the payment environment 200 that process the transaction 400. A request message 461 is a transaction message 460 having a specific code that tells the different systems 201 that the message is requesting an authorization of a transaction 400. The response message 462 is an authorization response transaction message 460 which would either approve or decline the transaction 400. Every request and response message 461, 462 is made up of a number of fields 510 (see below). These fields 510 carry important information such as cardholder data, type and value of operation, and acquiring institution details such as name, address, etc. These fields 510 are sent in transaction messages 461, 462 between the different systems 201. The fields 510 used between the various systems 201 may be different.

Figure 5:
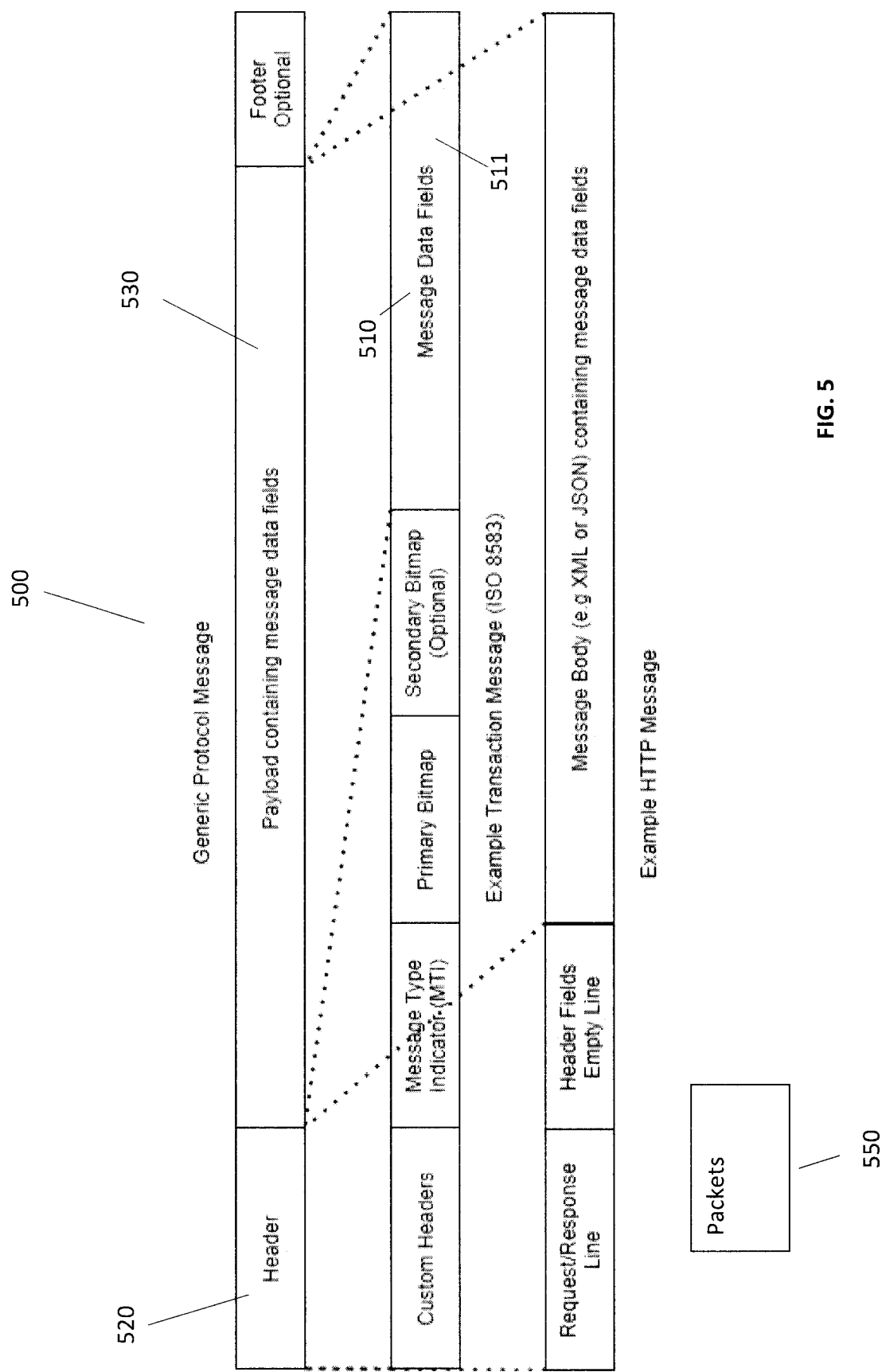
FIG. 5 is a block diagram illustrating an example transaction message format in accordance with an embodiment of the application.
Figure 6:
FIG. 6 is a listing illustrating example information contained in the payload of a transaction message in accordance with an embodiment of the application.

FIG. 5 is a block diagram illustrating an example transaction message format 500 in accordance with an embodiment of the application. And, FIG. 6 is a listing illustrating example information 600 contained in the payload 530 of a transaction message 460, 461, 462 in accordance with an embodiment of the application. A transaction message format 500 is a description of the contents of a protocol message (e.g., 460, 461, 462) as a set of typed and named fields 510. The protocol used includes, for example, ISO 8583 or a higher-level application protocol such as HTTP. Decoding uses header and payload information to parse fields 510 such as card information, withdrawal amounts, and other information from the header 520 and payload 530.

As mentioned above, existing firewalls are able to block many current attacks, however, these existing systems fall short in a few ways. First, existing network-based firewalls are only able to block transactions based on IP addresses and/or port numbers. As much as existing firewalls are able to inspect fields 510 within messages 460, they are unable to block the transaction 400 at the field level. This renders these firewalls useless in attacks where potentially fraudulent transactions 400 are coming across networks 351 where the originating source IP address and port number are indistinguishable. This happens for example when transactions 400 are acquired by intermediaries 251, or attackers use virtual private networks ("VPNs") or proxies to hide their originating IP addresses. In addition, existing firewalls are unable to look at the journey 450 of the transactions 400 and make decisions on the fly whether or not to allow a specific transaction 400. The transaction firewall 100 of the present application solves the problem of man-in-the-middle attacks where a malicious piece of code could alter the transaction fields 510 or the transaction outcome. Furthermore, existing firewalls do not decode the entire payload 530 of proprietary financial protocols in order to surface the fields 510 in these messages 460 so that these fields 510 can be used to make better decisions in real-time whether or not a specific transaction 400 should be allowed. Finally, existing Web application firewalls look at only the signature of an attack and are only able to block based on IP address and port number and not on field level information.

Figure 7:
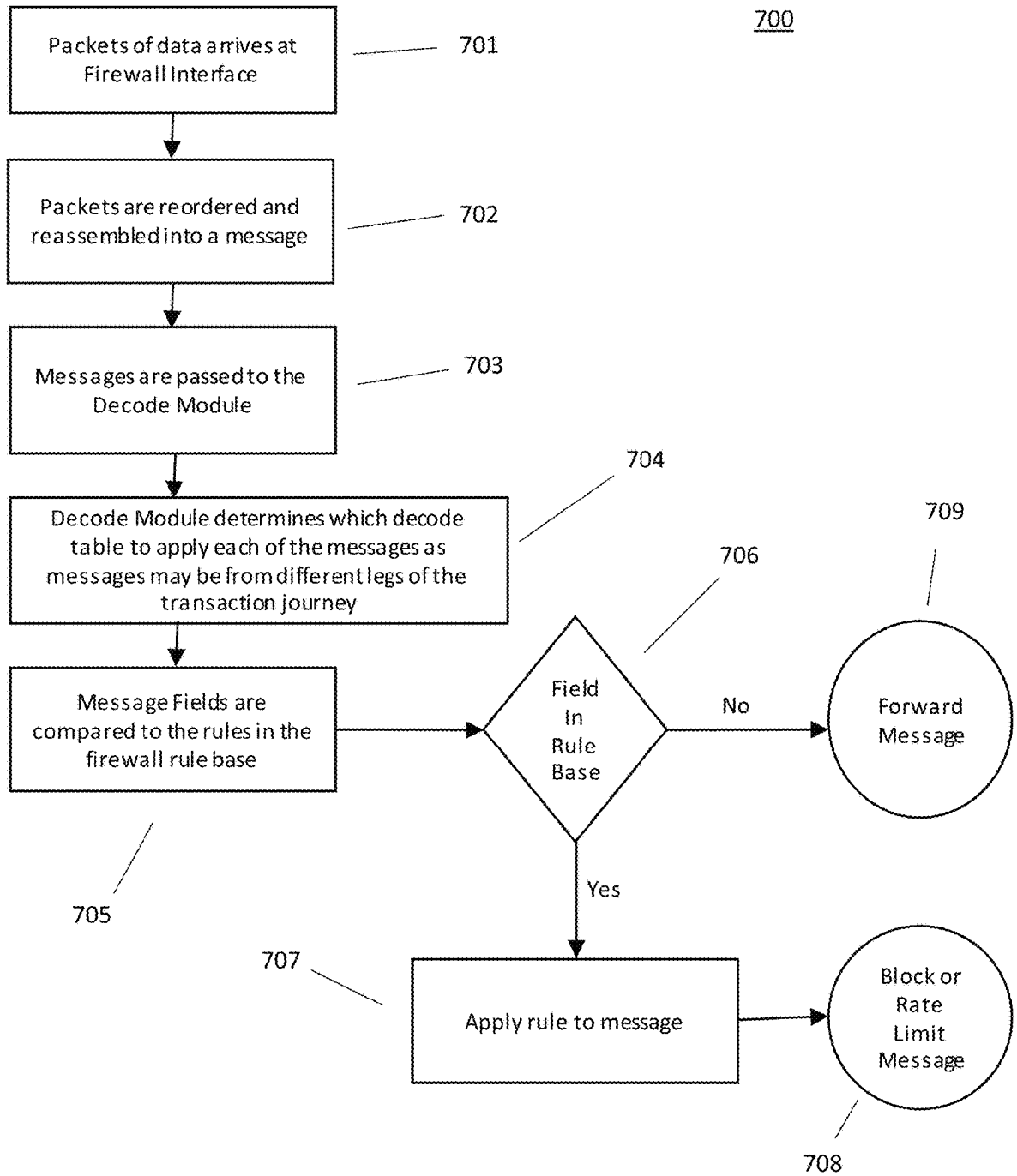
FIG. 7 is a flow chart illustrating operations of modules within a transaction firewall for reconstructing and framing packet data from each leg of a transaction journey into respective transaction message formats, in accordance with an embodiment of the application.

FIG. 7 is a flow chart illustrating operations 700 of modules (e.g., 321, 331) within a transaction firewall 100 for reconstructing and framing packet data 550 from each leg (e.g., 451) of a transaction journey 450 into respective transaction message formats 500, in accordance with an embodiment of the application. At step 701, packets 550 of data arrive at the interface 110, 350 of the transaction firewall 100. At step 702, the packets 550 are reordered and reassembled into a message 460. At step 703, the messages 460 are passed to the decode module 140 (and/or 321, 331) At step 704, the decode module 140 determines which decode table 1000 to apply to each of the messages 460 as the messages 460 may be from different legs 451 of the transaction journey 450. At step 705, the message fields 500 are compared to the rules 1300 in the firewall rule base 132. At step 706, if a field 510, 511 is found in the firewall rule base 132, then operations 700 proceed to step 707, otherwise operations 700 proceed to step 709. At step 707, if a field 510, 511 is found in the firewall rule base 132, then a rule 1310 is applied to the message 460 and, at step 708, the message 460 is blocked or rate limited. And, at step 709, if a field 510, 511 is not found in the firewall rule base 132, then the message 460 is forwarded.

Figure 8:
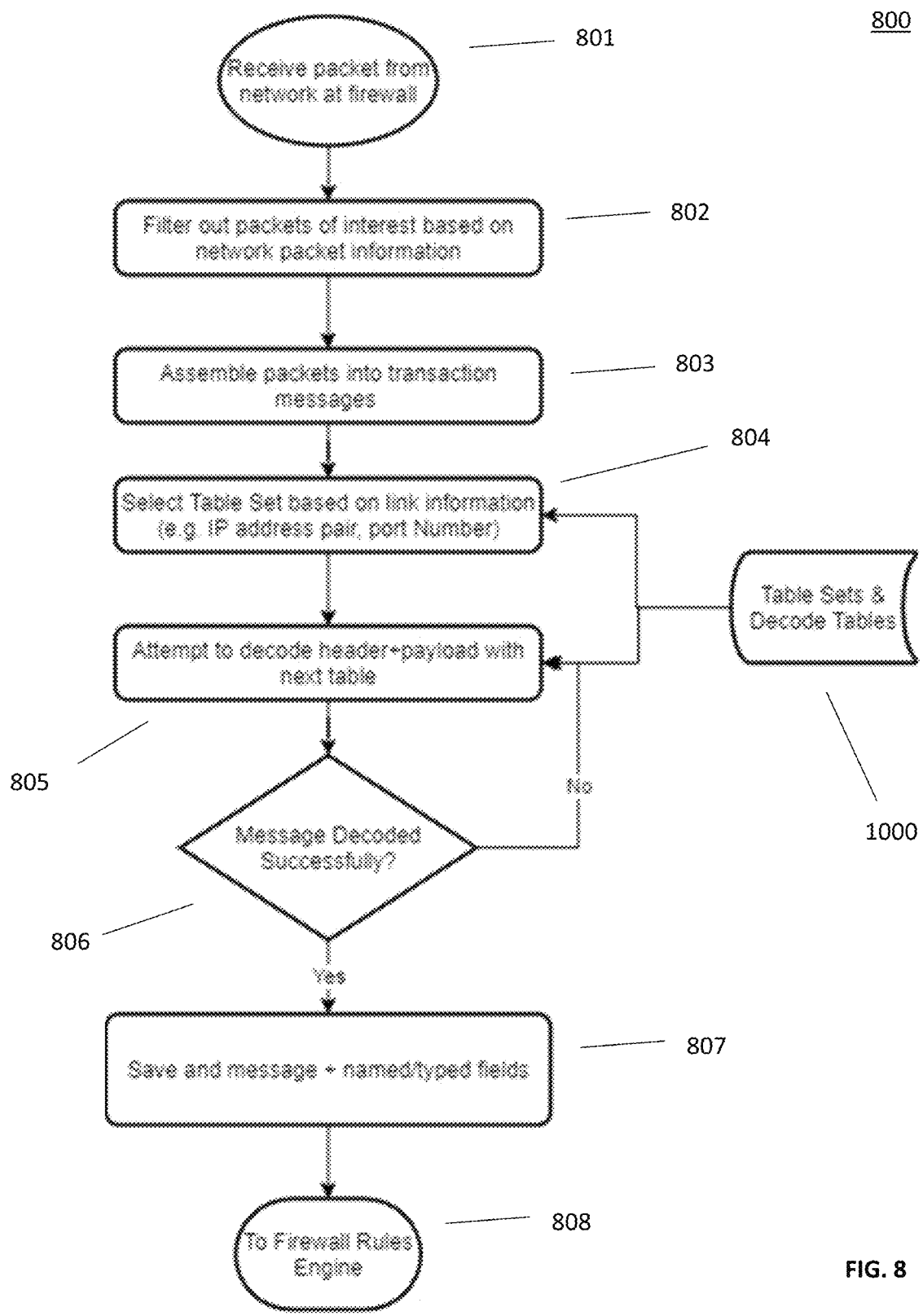
FIG. 8 is a flow chart illustrating operations of modules within a transaction firewall for decoding a transaction message into its respective fields, in accordance with an embodiment of the application.

FIG. 8 is a flow chart illustrating operations 800 of modules (e.g., 321, 331) within a transaction firewall 100 for decoding a transaction message 460 into its respective fields 510, in accordance with an embodiment of the application. At step 801, a packet 550 is received from the network 351 at the transaction firewall 100. At step 802, packets 550 of interest are filtered out based on network packet information. At step 803, the packets 550 are assembled into transaction messages 460. At step 804, a table set 1000 is selected based on link information (e.g., IP address pair, port number). At step 805, an attempt is made to decode the header plus (+) payload 520, 530 with the next table 1000. At step 806, if the message 460 is successfully decoded, then operations 800 proceed to step 807, otherwise operations 800 return to step 805. At step 807, if the message 460 is successfully decoded, then the message 460 and named/typed fields 510 are saved (e.g., in memory 330) and, at step 808, operations 800 proceed to the firewall rules engine 150.

Figure 9:
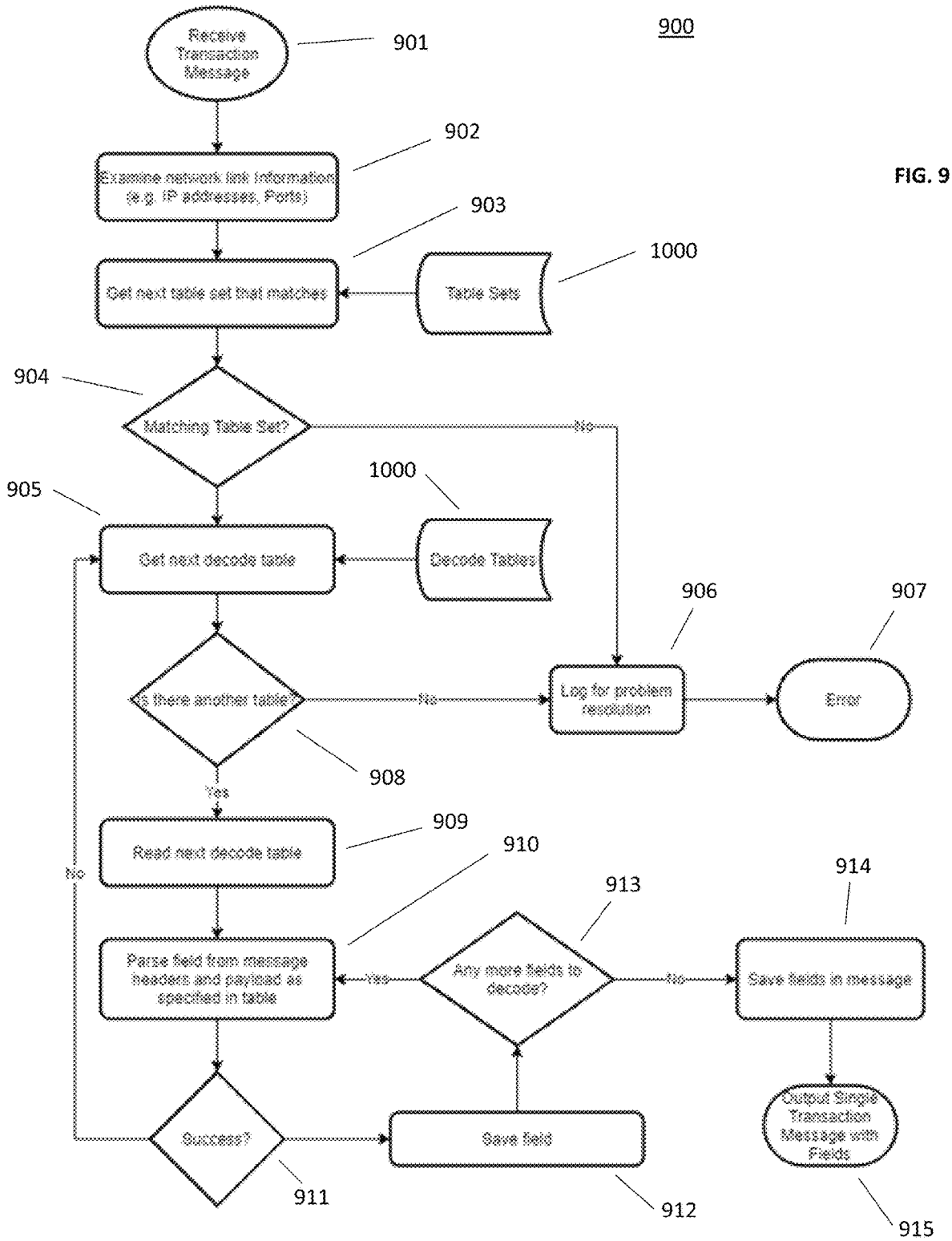
FIG. 9 is a flow chart illustrating operations of modules within a transaction firewall for decoding message fields and applying a set of predefined rules to the message fields, in accordance with an embodiment of the application.

FIG. 9 is a flow chart illustrating operations 900 of modules (e.g., 321, 331) within a transaction firewall 100 for decoding message fields 510 and applying a set of pre-defined rules 1300 to the message fields 510, in accordance with an embodiment of the application. At step 901, a transaction message 460 is received. At step 902, the network link information (e.g., IP address, ports, etc.) are examined. At step 903, a next table set 1000 that matches is received. At step 904, if the table set 1000 matches, then operations 900 proceed to step 905, otherwise operations 900 proceed to step 906. At step 906, if the next table set 1000 does not match, then a problem is logged for resolution and, at step 907, an error is generated. At step 905, if the table set 1000 matches, then a next decode table 1000 is retrieved and operations 900 proceed to step 908. At step 908, if there is another decode table 1000, then operations 900 proceed to step 909, otherwise operations 900 proceed to step 906. At step 909, the next decode table 1000 is read. At step 910, a field 510 is parsed from the message header(s) and payload 520, 530 as specified in the decode table 1000. At step 911, if the field 510 is successfully parsed, then operations 900 proceed to step 912, otherwise operations 900 return to step 905. At step 912, if the field 510 is successfully parsed, then the field 510 is saved (e.g., in memory 330) and operations 900 proceed to step 913. At step 913, if there are more fields 510 to decode, then operations 900 return to step 910, otherwise operations 900 proceed to step 914. At step 914, if there are no more fields 510 to decode, then the fields 510 in the message 460 are saved (e.g., in memory 330) and, at step 915, a single transaction message 460 with fields 510 is output.

FIG. 10 is an example decode table 1000 in accordance with an embodiment of the application. According to one embodiment, multiple decode tables 1000 may form a decode table set 1000.

Figure 11:
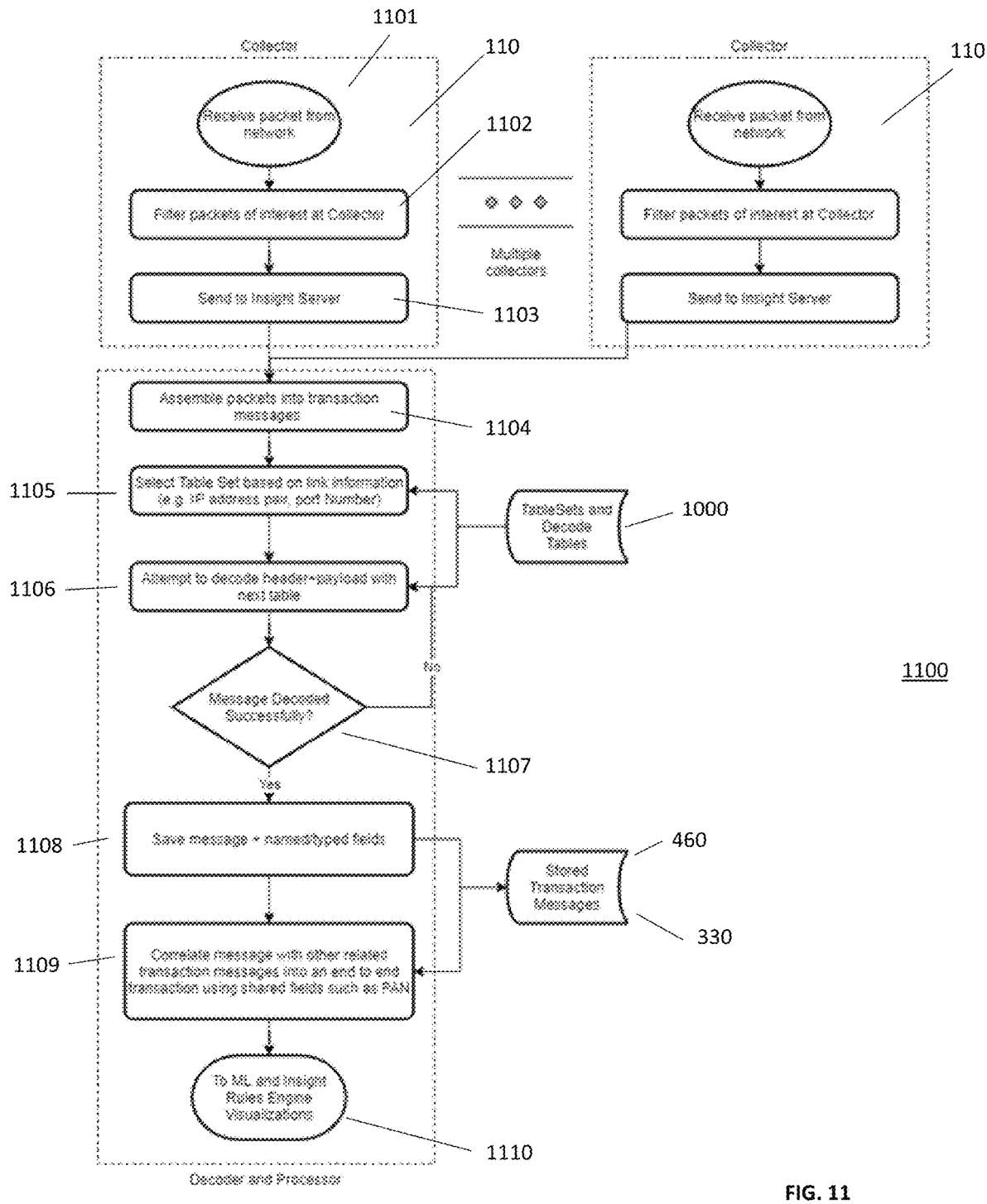
FIG. 11 is a flow chart illustrating operations of modules within a transaction firewall for correlating each leg of the transaction journey into an end-to-end view of the transaction and all fields associated with the payload, in accordance with an embodiment of the application.

FIG. 11 is a flow chart illustrating operations 1100 of modules (e.g., 321, 331) within a transaction firewall 100 for correlating each leg (e.g., 451) of the transaction journey 450 into an end-to-end view (or model) 452 of the transaction 400 and all fields 510 associated with the payload 530, in accordance with an embodiment of the application. At step 1101, packets 550 are received from the network 351 at one or more collectors 110. At step 1102, packets of interest are filtered out at the one or more collectors 110. At step 1103, the packets 550 are sent from the one or more collectors 110 to the server 300. At step 1104, the packets are assembled into transaction messages 460. At step 1105, a table set 1000 is selected based on link information (e.g., IP address pair, port number). At step 1106, an attempt is made to decode the header plus (+) payload 520, 530 with the next table 1000. At step 1107, if the message is successfully decoded, then operations 1100 proceed to step 1108, otherwise operations 1100 return to step 1106. At step 1108, if the message 460 is successfully decoded, then the message 460 and named/typed fields 510 are saved (e.g., in memory 330). At step 1109, the message 460 is correlated with other related transaction messages 460 into an end-to-end view or model 452 of the transaction 400 using shared fields 510 such as the primary account number ("PAN") which is the credit or debit card number used in a payment transaction 400. The PAN field 510 is the field that holds the PAN. And, at step 1110, operations 1100 proceed to the machine learning and rules engines 160, 150. The machine learning engine 160 is where anomalies are detected in the transaction 400 using behavioural models. The rules engine 150 is where threshold-based rules 1300 are applied to the transaction 400 in order to determine if the transaction 400 is fraudulent or not.

Figure 12:
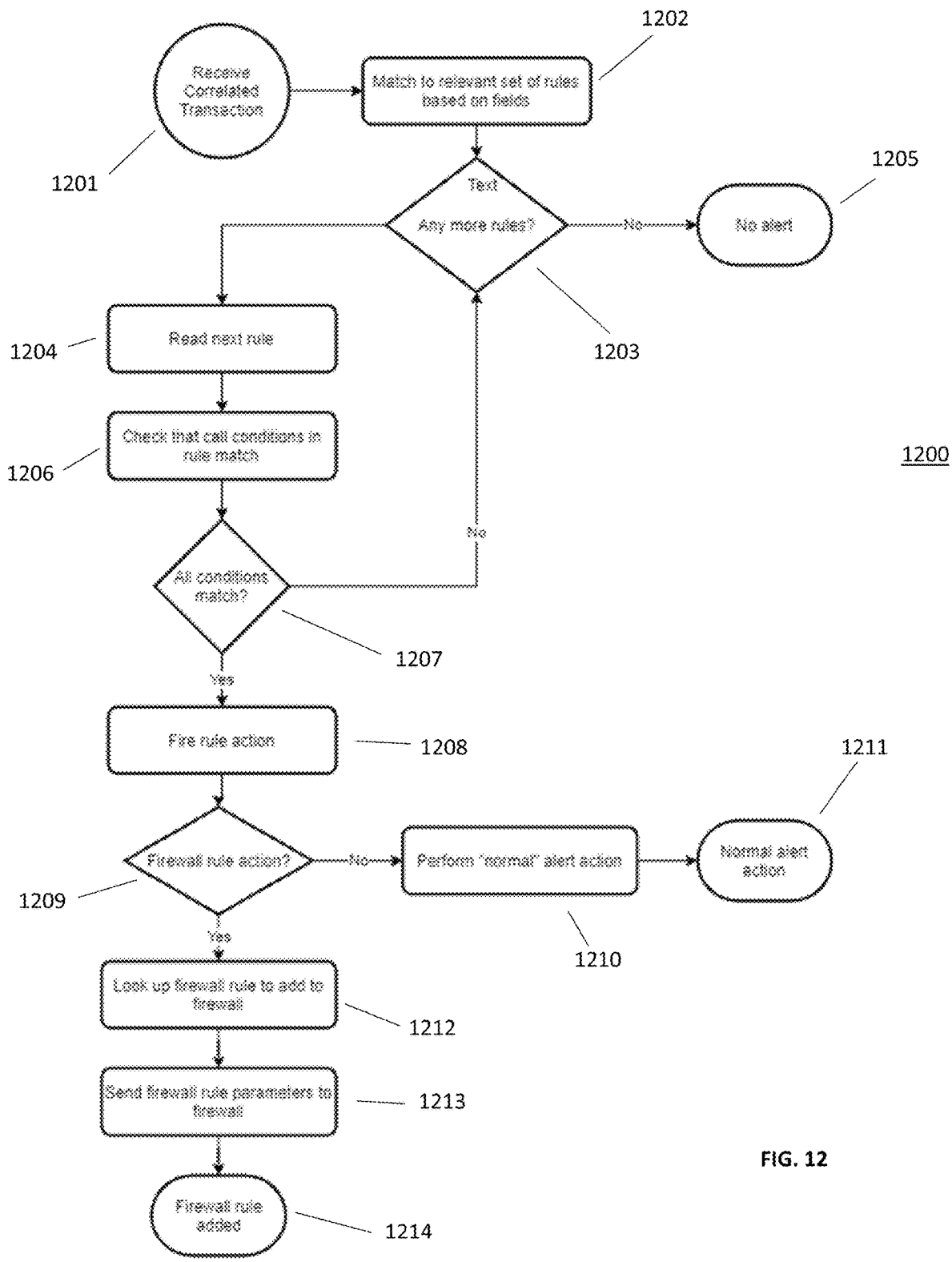
FIG. 12 is a flow chart illustrating operations of modules within a transaction firewall for applying predefined rules to messages in the server to decide whether to send new rules to the transaction firewall, in accordance with an embodiment of the application.

FIG. 12 is a flow chart illustrating operations 1200 of modules (e.g., 321, 331) within a transaction firewall 100 for applying predefined rules 1300 to messages in the server 300 to decide whether to send new rules (e.g., 1320) to the transaction firewall 100, in accordance with an embodiment of the application. At step 1301, a correlated transaction 400 is received (e.g., from step 1110 above). At step 1302, the correlated transaction 400 is matched to a relevant set of rules 1300 based on fields 510. At step 1203, if there are more rules 1300, then operations 1200 proceed to step 1204, otherwise operations proceed to step 1205. At step 1205, if there are no more rules 1300, then no alert is required. At step 1204, if there are more rules 1300, then the next rule (e.g., 1310) is read. At step 1206, a check that all conditions in the rule 1310 match is performed. At step 1207, if all conditions in the rule 1310 match, then operations 1200 proceed to step 1208, otherwise operations 1200 return to step 1203. At step 1208, a firewire rule action is found. At step 1209, if there is a rule action, then operations 1200 proceed to step 1212, otherwise operations 1200 proceed to step 1210. At step 1210, if there is no rule action, then a "normal" alert action is performed and, at step 1211, a normal alert action is generated. At step 1212, if there is a rule action, then a firewall rule (e.g., 1320) is looked-up to add to the transaction firewall 100. At step 1213, the parameters (e.g., 511) of the firewall rule 1320 are sent to the transaction firewall 100. And, at step 1214, the firewall rule 1320 is added at the transaction firewall 100.

Figure 13:
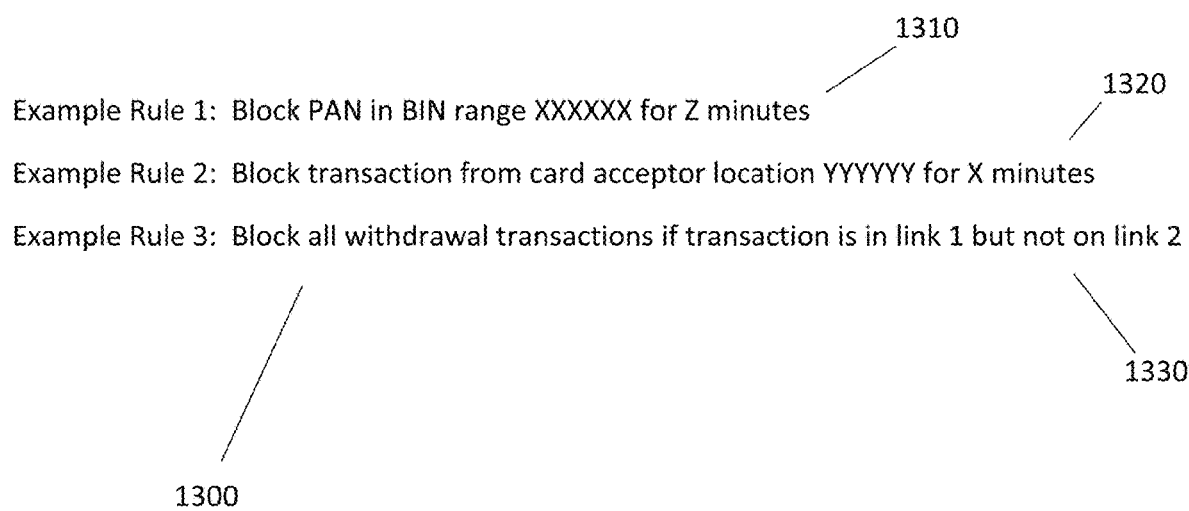
FIG. 13 is a listing of example predefined rules stored in a rule base of the transaction firewall and/or a rule base of the server, in accordance with an embodiment of the application; and, FIG. 14 is a flow chart illustrating operations of modules within a transaction firewall and/or server for detecting fraudulent transactions entering a payment environment, in accordance with an embodiment of the application.

FIG. 13 is a listing of example predefined rules 1310, 1320, 1330 (collectively 1300) stored in a rule base 132 of the transaction firewall 100 and/or a rule base 332 of the server 300, in accordance with an embodiment of the application. According to one embodiment, the transaction firewall rule base 132 may be different from the server rule base 332. In particular, the transaction firewall rule base 132 may be a separate rule base that gets populated with the rules 1300 from the server 300 once the server 300 triggers a rule action (see above).

According to one embodiment, the present application may be extended from a payment transaction focus to cover other transaction forms.

The above embodiments may contribute to an improved transaction firewall method and system and may provide one or more advantages. First, the transaction firewall 100 of the present application is a field level firewall that has the ability to reconstruct the entire payload 530 of a message 460 and decode every field 510, make these fields 510 available to the firewall rule base 132 where rules 1300 can be applied directly to these fields 510 in order to allow, deny or rate limit the transaction 400. Second, with the transaction firewall 100, transactions 400 that come across the same network 351 can be acted on individually, without affecting other transactions 400 that are coming across the same network 351. Third, the transaction firewall 100 performs actions on transactions 400 based on financial message field data instead of IP address and/or port number. It is able to act on each field 510 or set of fields 510 so that offending transactions 400 can be blocked or rate limited individually based on the fields 510 in the message 460. Fourth, the transaction firewall 100 transparently bridges incoming financial transaction messages 460 to reduce transaction latency and only blocks messages 460 when instructed to do so by a policy decision point ("PDP") 300. Fifth, the transaction firewall 100 provides a response message 462 back to the originator of the message 460 indicating the reason why the transaction 400 was blocked. Sixth, the transaction firewall 100 reduces the risk of organizations being susceptible to fraud attacks. Seventh, the transaction firewall 100 lowers the cost associated with fraud losses. Eighth, the transaction firewall 100 automates the process of detection of fraudulent activity and takes immediate action so that no human intervention is required. And, ninth, the transaction firewall 100 moves the ability of declining transactions 400 down the value chain to acquirers and intermediaries, instead of issuers alone.

Aspects of the above described method may be illustrated with the aid of a flowchart.

Figure 14:
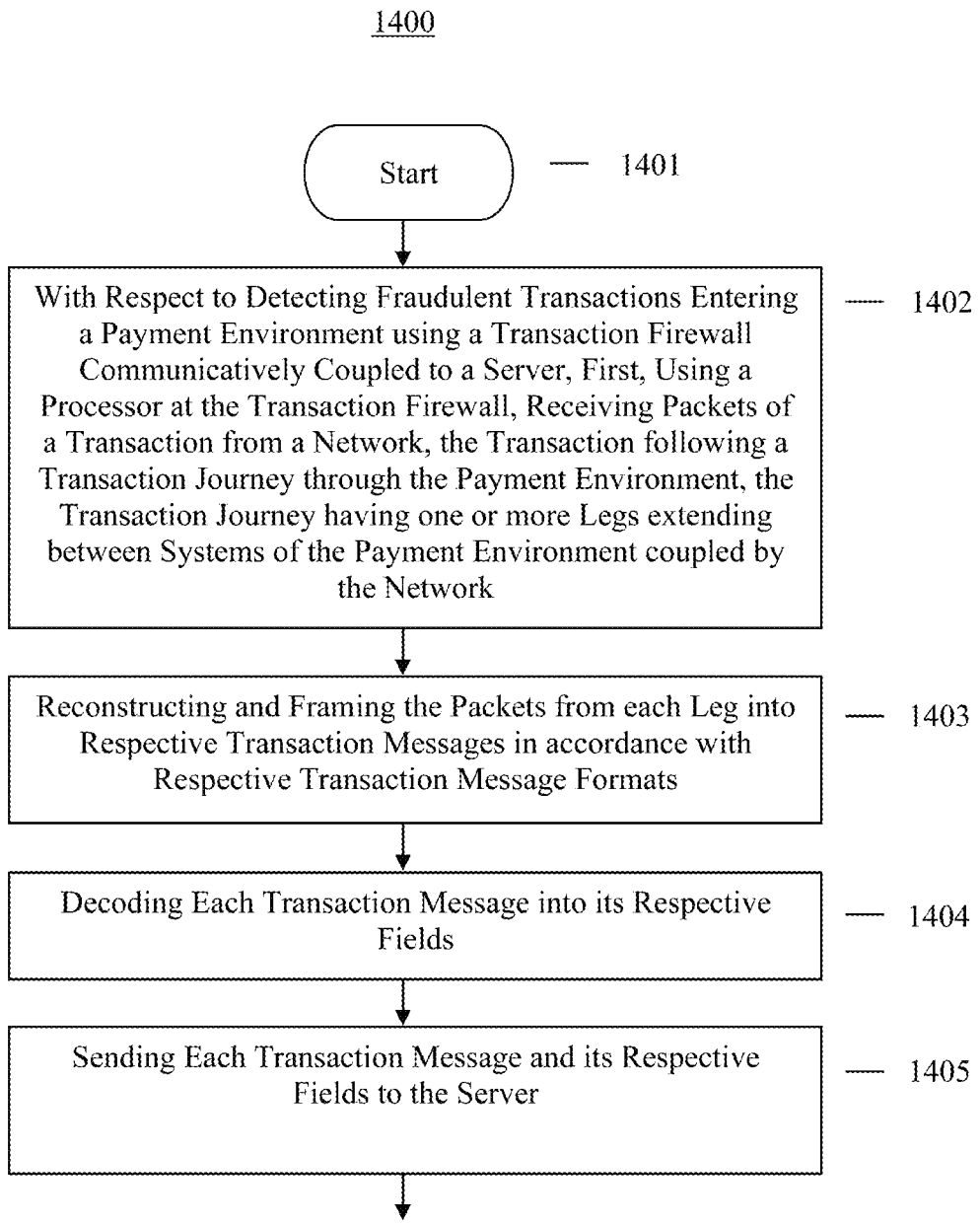
Figure 14:
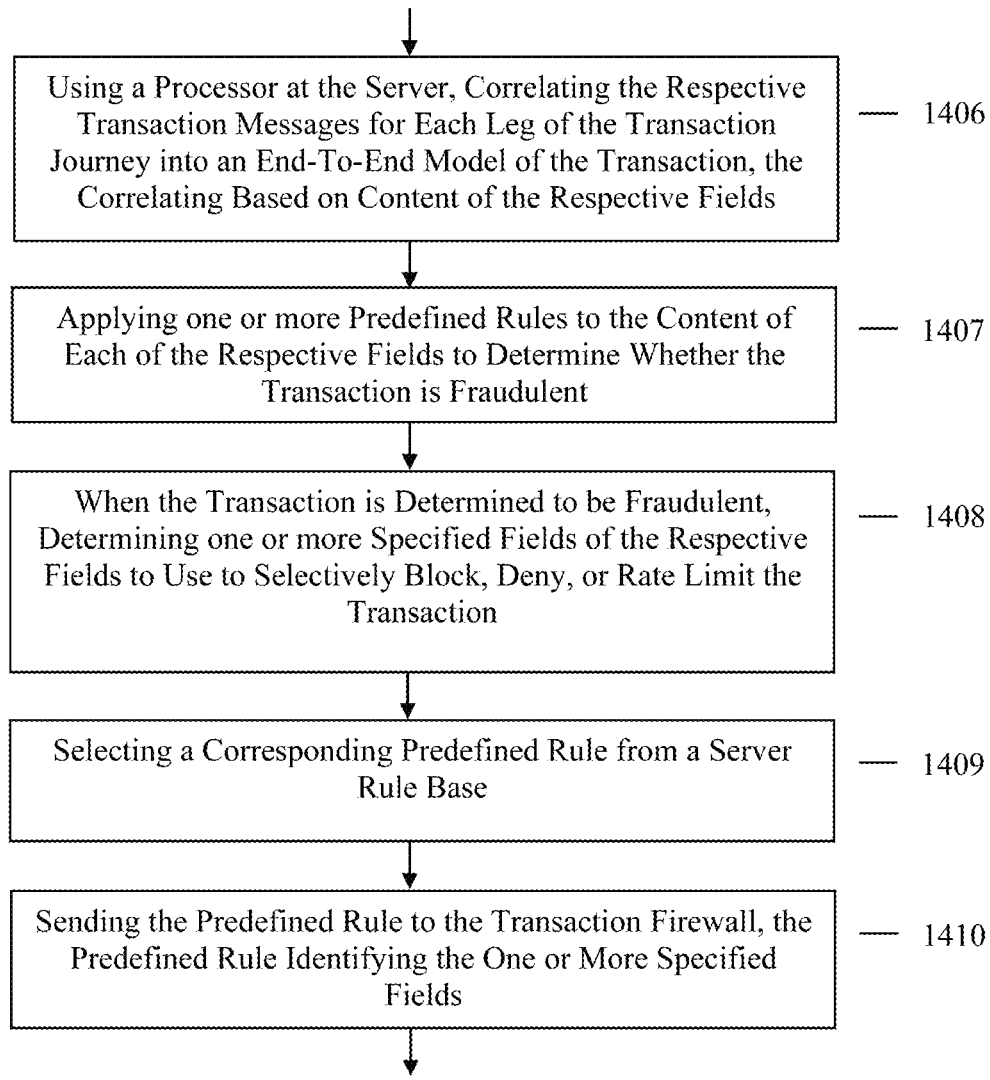
Figure 14:
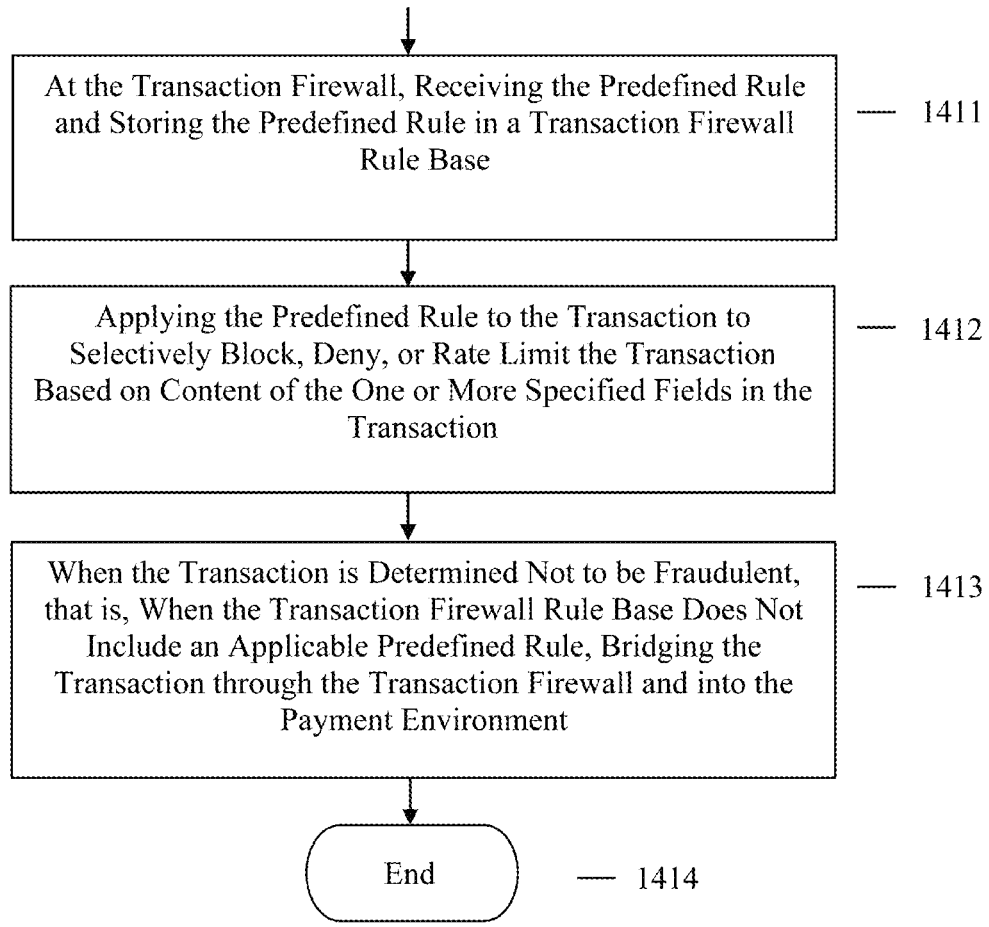

FIG. 14 is a flow chart illustrating operations 1400 of modules (e.g., 321, 331) within a transaction firewall 100 and/or server 300 for detecting fraudulent transactions 400 entering a payment environment 200, in accordance with an embodiment of the application.

At step 1401, the operations 1400 start.

At step 1402, using a processor 320 at the transaction firewall 100, packets 550 of a transaction 400 are received from a network (e.g., 351), the transaction 400 following a transaction journey 450 through the payment environment 200, the transaction journey 240 having one or more legs 451 extending between systems 201 of the payment environment 200 coupled by the network 351.

At step 1403, the packets 550 from each leg 451 are reconstructed and framed into respective transaction messages 460 in accordance with respective transaction message formats 500.

At step 1404, each transaction message 460 is decoded into its respective fields 510.

At step 1405, each transaction message 460 and its respective fields 510 are sent to the server 300.

At step 1406, using a processor 320 at the server 300, the respective transaction messages 460 for each leg 451 of the transaction journey 450 are correlated into an end-to-end model 452 of the transaction 400, the correlating based on content of the respective fields 510.

At step 1407, one or more predefined rules 1300 are applied to the content of each of the respective fields 510 to determine whether the transaction 400 is fraudulent.

At step 1408, when the transaction is determined to be fraudulent, one or more specified fields 511 of the respective fields 510 to use to selectively block, deny, or rate limit the transaction 400 are determined.

At step 1409, a corresponding predefined rule (e.g., 1310) is selected from a server rule base 332.

At step 1410, the predefined rule 1310 is sent to the transaction firewall 100, the predefined rule 1310 identifying the one or more specified fields 511.

At step 1411, at the transaction firewall 100, the predefined rule 1310 is received and the predefined rule 1310 is stored in a transaction firewall rule base 132.

At step 1412, the predefined rule 1310 is applied to the transaction 400 to selectively block, deny, or rate limit the transaction 400 based on content of the one or more specified fields 511 in the transaction 400.

At step 1413, when the transaction 400 is determined not to be fraudulent, that is, when the transaction firewall rule base 132 does not include an applicable predefined rule 1310, the transaction 400 is bridged 130 through the transaction firewall 100 and into the payment environment 200.

At step 1414, the operations 1400 end.

In the above method, the applying of one or more predefined rules 1300 to each of the respective fields 510 to determine whether the transaction 400 is fraudulent may further include calculating a transaction score 170. The transaction 400 may be determined to be fraudulent when the transaction score 170 exceeds a predetermined threshold. The decoding of each transaction message 460 into respective fields 510 may be performed using a decode table 1000. The method may further include sending a response message 462 to an originating system (e.g., 210) of the transaction 400 indicating whether the transaction 400 has been blocked, denied, or rate limited. The at least one of the one or more predetermined rules 1300 may be determined using a machine learning engine or algorithms 160 at the server 300. The transaction 400 may be selectively blocked, denied, or rate limited at the transaction firewall 100 upon instruction received from the server 300. The server 300 may include the transaction firewall 100. The transaction firewall 100 may be communicatively coupled to the server 300 over the network 351. The transaction 400 may be a financial transaction. The systems 201 of the payment environment 200 may include one or more of an acquiring device 210, a terminal handler 220, a transaction switch 230, and an authorization host 240. The transaction firewall 100 may be configured as a policy enforcement point ("PEP") and the server 300 may be configured as a policy decision point ("PDP"). The respective fields 510 may include transaction message payload fields 530. Content of the transaction message payload fields 530 may include shared primary account number ("PAN") information. The content of the one or more specified fields 511 may not include Internet Protocol ("IP") address or port number information. And, the method 1400 may be performed in real-time.

According to one embodiment, each of the above steps 1401-1414 may be implemented by a respective software module 331. According to another embodiment, each of the above steps 1401-1414 may be implemented by a respective hardware module 321 (e.g., application-specific hardware 321). According to another embodiment, each of the above steps 1401-1414 may be implemented by a combination of software 331 and hardware modules 321. For example, FIG. 14 may represent a block diagram illustrating the interconnection of specific hardware modules 1401-1414 (collectively 321) within the data processing system 300, each hardware module 1401-1414 adapted or configured to implement a respective step of the method of the application. As such, the present application advantageously improves the operation of the data processing system 300.

According to one embodiment, one or more of the software 331 and hardware modules 321 (or to components referred to as a "module" herein) may be implemented by one or more data processing systems 300 or components thereof.

According to one embodiment, certain implementations of the functionality of the present application are sufficiently mathematically, computationally, or technically complex that application-specific hardware (e.g., 321) or one or more physical computing devices (e.g., 300) (using appropriate executable instructions (e.g., 1400)) may be necessary or essential to perform that functionality, for example, due to the volume or complexity of the calculations involved and/or to provide results substantially in real-time.

While this application is primarily discussed as a method, a person of ordinary skill in the art will understand that the apparatus discussed above with reference to a data processing system 300 may be programmed to enable the practice of the method of the application. Moreover, an article of manufacture for use with a data processing system 300, such as a pre-recorded storage device or other similar computer readable medium or product including program instructions recorded thereon, may direct the data processing system 300 to facilitate the practice of the method of the application. It is understood that such apparatus and articles of manufacture also come within the scope of the application.

In particular, the sequences of instructions which when executed cause the method described herein to be performed by the data processing system 300 can be contained in a data carrier product according to one embodiment of the application. This data carrier product can be loaded into and run by the data processing system 300. In addition, the sequences of instructions which when executed cause the method described herein to be performed by the data processing system 300 can be contained in a computer program or software product according to one embodiment of the application. This computer program or software product can be loaded into and run by the data processing system 300. Moreover, the sequences of instructions which when executed cause the method described herein to be performed by the data processing system 300 can be contained in an integrated circuit product (e.g., a hardware module or modules 321) which may include a coprocessor or memory according to one embodiment of the application. This integrated circuit product can be installed in the data processing system 300.

The embodiments of the application described above are intended to be exemplary only. Those skilled in the art will understand that various modifications of detail may be made to these embodiments, all of which come within the scope of the application.

What is claimed is:

1. A method for detecting fraudulent transactions entering a payment environment using a transaction firewall communicatively coupled to a server, the method comprising:
using a processor at the transaction firewall, receiving packets of a transaction from a network, the transaction following a transaction journey through the payment environment, the transaction journey having one or more legs extending between systems of the payment environment coupled by the network;
reconstructing and framing the packets from each leg into respective transaction messages in accordance with respective transaction message formats;
decoding each transaction message into its respective fields;
sending each transaction message and its respective fields to the server;
using a processor at the server, correlating the respective transaction messages for each leg of the transaction journey into an end-to-end model of the transaction, the correlating based on content of the respective fields;
applying one or more predefined rules to the content of each of the respective fields to determine whether the transaction is fraudulent;
when the transaction is determined to be fraudulent, determining one or more specified fields of the respective fields to use to selectively block, deny, or rate limit the transaction;
selecting a corresponding predefined rule from a server rule base;
sending the predefined rule to the transaction firewall, the predefined rule identifying the one or more specified fields;
at the transaction firewall, receiving the predefined rule and storing the predefined rule in a transaction firewall rule base;
applying the predefined rule to the transaction to selectively block, deny, or rate limit the transaction based on content of the one or more specified fields in the transaction; and,
when the transaction is determined not to be fraudulent, that is, when the transaction firewall rule base does not include an applicable predefined rule, bridging the transaction through the transaction firewall and into the payment environment.

2. The method of claim 1, wherein the applying one or more predefined rules to each of the respective fields to determine whether the transaction is fraudulent further comprises calculating a transaction score.

3. The method of claim 2, wherein the transaction is determined to be fraudulent when the transaction score exceeds a predetermined threshold.

4. The method of claim 1, wherein the decoding each transaction message into respective fields is performed using a decode table.

5. The method of claim 1, further comprising sending a response message to an originating system of the transaction indicating whether the transaction has been blocked, denied, or rate limited.

6. The method of claim 1, wherein at least one of the one or more predetermined rules is determined using a machine learning engine or algorithms at the server.

7. The method of claim 1, wherein the transaction is selectively blocked, denied, or rate limited at the transaction firewall upon instruction received from the server.

8. The method of claim 1, wherein the server includes the transaction firewall.

9. The method of claim 1, wherein the transaction firewall is communicatively coupled to the server over the network.

10. The method of claim 1, wherein the transaction is a financial transaction.

11. The method of claim 1, wherein the systems of the payment environment include one or more of an acquiring device, a terminal handler, a transaction switch, and an authorization host.

12. The method of claim 1, wherein the transaction firewall is configured as a policy enforcement point and the server is configured as a policy decision point.

13. The method of claim 1, wherein the respective fields include transaction message payload fields.

14. The method of claim 13, wherein content of the transaction message payload fields includes shared primary account number ("PAN") information.

15. The method of claim 1, wherein the content of the one or more specified fields does not include Internet Protocol ("IP") address or port number information.

16. The method of claim 1, wherein the method is performed in real-time.

17. A system for detecting fraudulent transactions entering a payment environment, comprising:
a transaction firewall communicatively coupled to a server;
a processor coupled to memory; and,
at least one of hardware and software modules within the memory and controlled or executed by the processor, the modules including:
a module for, at the transaction firewall, receiving packets of a transaction from a network, the transaction following a transaction journey through the payment environment, the transaction journey having one or more legs extending between systems of the payment environment coupled by the network;
a module for reconstructing and framing the packets from each leg into respective transaction messages in accordance with respective transaction message formats;
a module for decoding each transaction message into its respective fields;
a module for sending each transaction message and its respective fields to the server;
a module for, at the server, correlating the respective transaction messages for each leg of the transaction journey into an end-to-end model of the transaction, the correlating based on content of the respective fields;
a module for applying one or more predefined rules to the content of each of the respective fields to determine whether the transaction is fraudulent;
a module for, when the transaction is determined to be fraudulent, determining one or more specified fields of the respective fields to use to selectively block, deny, or rate limit the transaction;
a module for selecting a corresponding predefined rule from a server rule base;
a module for sending the predefined rule to the transaction firewall, the predefined rule identifying the one or more specified fields;
a module for, at the transaction firewall, receiving the predefined rule and storing the predefined rule in a transaction firewall rule base;

a module for, applying the predefined rule to the transaction to selectively block, deny, or rate limit the transaction based on content of the one or more specified fields in the transaction; and, a module for, when the transaction is determined not to be fraudulent, that is, when the transaction firewall rule base does not include an applicable predefined rule, bridging the transaction through the transaction firewall and into the payment environment.

18. A method for detecting fraudulent transactions entering a payment environment using a transaction firewall communicatively coupled to a server, the method comprising:

using a processor at the transaction firewall, receiving packets of a transaction from a network, the transaction following a transaction journey through the payment environment, the transaction journey having one or more legs extending between systems of the payment environment coupled by the network;

reconstructing and framing the packets from each leg into respective transaction messages in accordance with respective transaction message formats;

decoding each transaction message into its respective fields;

sending each transaction message and its respective fields to the server;

receiving a predefined rule from the server and storing the predefined rule in a transaction firewall rule base, the predefined rule identifying one or more specified fields;

applying the predefined rule to the transaction to selectively block, deny, or rate limit the transaction based on content of the one or more specified fields in the transaction; and, when the transaction is determined not to be fraudulent, that is, when the transaction firewall rule base does not include an applicable predefined rule, bridging the transaction through the transaction firewall and into the payment environment.

19. The method of claim 18, wherein, using a processor at the server, the server: correlates the respective transaction messages for each leg of the transaction journey into an end-to-end model of the transaction, the correlating based on content of the respective fields; applies one or more predefined rules to the content of each of the respective fields to determine whether the transaction is fraudulent; when the transaction is determined to be fraudulent, determines the one or more specified fields of the respective fields to use to selectively block, deny, or rate limit the transaction; selects the corresponding predefined rule from a server rule base; and, sends the predefined rule to the transaction firewall.

20. A transaction firewall for detecting fraudulent transactions entering a payment environment, the transaction firewall communicatively coupled to a server, the transaction firewall comprising:

a processor coupled to memory; and, at least one of hardware and software modules within the memory and controlled or executed by the processor, the modules including:

a module for receiving packets of a transaction from a network, the transaction following a transaction journey through the payment environment, the transaction journey having one or more legs extending between systems of the payment environment coupled by the network;

a module for reconstructing and framing the packets from each leg into respective transaction messages in accordance with respective transaction message formats;

a module for decoding each transaction message into its respective fields;

a module for sending each transaction message and its respective fields to the server;

a module for receiving a predefined rule from the server and storing the predefined rule in a transaction firewall rule base, the predefined rule identifying one or more specified fields;

a module for applying the predefined rule to the transaction to selectively block, deny, or rate limit the transaction based on content of the one or more specified fields in the transaction; and, a module for, when the transaction is determined not to be fraudulent, that is, when the transaction firewall rule base does not include an applicable predefined rule, bridging the transaction through the transaction firewall and into the payment environment.

21. A method for detecting fraudulent transactions entering a payment environment using a server communicatively coupled to a transaction firewall, the method comprising:

using a processor at the server, for a transaction, receiving each transaction message and its respective fields from the transaction firewall, the transaction following a transaction journey through the payment environment, the transaction journey having one or more legs extending between systems of the payment environment coupled by a network;

correlating the respective transaction messages for each leg of the transaction journey into an end-to-end model of the transaction, the correlating based on content of the respective fields;

applying one or more predefined rules to the content of each of the respective fields to determine whether the transaction is fraudulent;

when the transaction is determined to be fraudulent, determining one or more specified fields of the respective fields to use to selectively block, deny, or rate limit the transaction by the transaction firewall;

selecting a corresponding predefined rule from a server rule base; and, sending the predefined rule to the transaction firewall, the predefined rule identifying the one or more specified fields.

22. The method of claim 21, wherein, using a processor at the transaction firewall, the transaction firewall: receives packets of the transaction from the network; reconstructs and frames the packets from the each leg into the respective transaction messages in accordance with respective transaction message formats; decodes each transaction message into its respective fields; sends the each transaction messages and its respective fields to the server; receives the predefined rule and stores the predefined rule in a transaction firewall rule base; applies the predefined rule to the transaction to selectively block, deny, or rate limit the transaction based on content of the one or more specified fields in the transaction; and, when the transaction is determined not to be fraudulent, that is, when the transaction firewall rule base does not include an applicable predefined rule, bridges the transaction through the transaction firewall and into the payment environment.

23. A server for detecting fraudulent transactions entering a payment environment, the server communicatively coupled to a transaction firewall, the server comprising:

a processor coupled to memory; and,
at least one of hardware and software modules within the memory and controlled or executed by the processor, the modules including:
- a module for, for a transaction, receiving each transaction message and its respective fields from the transaction firewall, the transaction following a transaction journey through the payment environment, the transaction journey having one or more legs extending between systems of the payment environment coupled by a network;
- a module for correlating the respective transaction messages for each leg of the transaction journey into an end-to-end model of the transaction, the correlating based on content of the respective fields;
- a module for applying one or more predefined rules to the content of each of the respective fields to determine whether the transaction is fraudulent;
- a module for, when the transaction is determined to be fraudulent, determining one or more specified fields of the respective fields to use to selectively block, deny, or rate limit the transaction by the transaction firewall;
- a module for selecting a corresponding predefined rule from a server rule base; and,
- a module for sending the predefined rule to the transaction firewall, the predefined rule identifying the one or more specified fields.

* * * * *